United States Patent

Kahl

(10) Patent No.: US 9,047,167 B2
(45) Date of Patent: Jun. 2, 2015

(54) CALCULATING THE MODULAR INVERSES OF A VALUE

(75) Inventor: Helmut Kahl, München (DE)

(73) Assignee: Giesecke & Devrient GmbH, München (DE)

( * ) Notice: Subject to any disclaimer, the term of this patent is extended or adjusted under 35 U.S.C. 154(b) by 3302 days.

(21) Appl. No.: 10/513,652

(22) PCT Filed: May 5, 2003

(86) PCT No.: PCT/EP03/04695
§ 371 (c)(1),
(2), (4) Date: Nov. 5, 2004

(87) PCT Pub. No.: WO03/093972
PCT Pub. Date: Nov. 13, 2003

(65) Prior Publication Data
US 2005/0175174 A1 Aug. 11, 2005

(30) Foreign Application Priority Data

May 6, 2002 (DE) .................................. 102 20 262

(51) Int. Cl.
*H04L 9/28* (2006.01)
*G06F 7/72* (2006.01)
(52) U.S. Cl.
CPC ...................................... *G06F 7/721* (2013.01)
(58) Field of Classification Search
CPC ....................................................... G06F 7/721
USPC ....................................... 380/28, 30; 713/180
See application file for complete search history.

(56) References Cited

U.S. PATENT DOCUMENTS

| 4,405,829 A | 9/1983 | Rivest et al. |
| 6,609,141 B1* | 8/2003 | Montague ...................... 708/491 |
| 2002/0126838 A1* | 9/2002 | Shimbo et al. .................. 380/28 |
| 2005/0185791 A1* | 8/2005 | Chen et al. ....................... 380/30 |
| 2005/0190912 A1* | 9/2005 | Hopkins et al. ................. 380/44 |

FOREIGN PATENT DOCUMENTS

| DE | 10101884 | 10/2001 |
| WO | 01/52051 | 7/2001 |

OTHER PUBLICATIONS

Internet Draft Jan. 2000.*

(Continued)

*Primary Examiner* — Ellen Tran
(74) *Attorney, Agent, or Firm* — Martine Penilla Group, LLP

(57) ABSTRACT

A method for calculating the modular inverse of a value in relation to a module is used for cryptographic calculations on a portable data carrier. The method includes determining a breakdown of the module into at least two factors, calculating a respective auxiliary value for each of the factors, wherein each auxiliary value is the modular inverse of the value in relation to the respective factor as module, and calculating the modular inverse of the value in relation to the module using the calculated auxiliary values. The method offers an increase in efficiency, with greater efficiency obtained the stronger the computing outlay depends on the length of the module in the inversion method. The method is suitable for execution by relatively low-power processors, and security of the calculation against spying attacks is not impaired. If security requirements are high, combining the method with suitable measures against spying presents no problems.

22 Claims, 2 Drawing Sheets

(56) References Cited

OTHER PUBLICATIONS

Von Zur Gathen, J., and Gerhard, J.; Modern Computer Algebra, 1999, pp. 46-48, 67-68, 96-99, 243-249, 304-305, Cambridge Univ. Press, UK.

Harrison, M., consulting editor, The Art of Computer Programming, 1981, pp. 320-327, 339, 606, vol. 2/Seminumerical Algorithms, Addison-Wesley Pub. Co., Philippines.

* cited by examiner

CALCULATING THE MODULAR INVERSES OF A VALUE

BACKGROUND OF THE INVENTION

1. Field of the Invention

The invention relates in general to the technical domain of algorithms efficiently executable by an automatic processor and more especially to an improved algorithm for modular inversion. The invention is particularly suitable for cryptographic applications, as occur, for example, in connection with smart cards.

2. Description of the Related Art

In the field of cryptography methods for modular inversion are employed, for example, in the generation of a pair of keys for the RSA encoding and signature method described in U.S. Pat. No. 4,405,829. The RSA method uses a public key (E, N) and a secret private key R, wherein the value N is the product of two large prime numbers P and Q. For calculating the pair of keys the values P, Q and E are first established. The private key R is then calculated as the modular inverse of the value E in relation to the module M with $M=(P-1)\cdot(Q-1)$.

In general, for two given whole numbers E and M the modular inverse of the value E in relation to the module M is defined as the number R to which $0 \leq R < M$ and $1 = E \cdot R \mod M$ applies; the result R is also designated by $1/E$. A modular inverse R exists if E and M are relatively prime.

Algorithms for calculating the modular inverse of a given value E in relation to a given module M are known per se. For example, the use of the extended Euclidian algorithm for modular inversion is described on pages 47 and 67 of the book by J. v. z. Gathen and J. Gerhard, "Modern Computer Algebra", first edition, Cambridge University Press, 1999 (algorithm 3.6 and theorem 4.1). A small increase in efficiency in the application example of RSA key pair calculation is possible by a transformation according to the Chinese remainder theorem. A modification of the extended Euclidian algorithm, particularly advantageous in connection with binary numbers, is Stein's method, described on pages 321 to 324 of the book by Donald E. Knuth, "The Art of Computer Programming", Vol. 2, second edition, Addison-Wesley, 1981, in connection with exercise 35 on page 339 and the solution thereto on page 606.

The methods for modular inversion mentioned are, however, relatively expensive in terms of computing. They require several times the computing time of other elementary modular computing operations, such as, e.g. modular multiplication (see page 304, corollary 11.6 of said book by Gathen and Gerhard). This is particularly problematic if the modular inversion is to be executed by a processor with relatively low power, as is the case, for example, in the processor of a smart card or some other portable data carrier.

SUMMARY OF THE INVENTION

An object of the invention is therefore to provide a method for modular inversion which is efficient when performed by a machine. A further object of the invention is to provide a method for modular inversion that is suitable for use for cryptographic calculations on a portable data carrier.

According to the invention, the above objects are completely or partially achieved by a method for calculating the modular inverse of a value in relation to a module, with the steps:

a) determining a breakdown of the module into at least two factors, b) calculating a respective auxiliary value for each of the factors determined in step a), wherein each auxiliary value is the modular inverse of the value in relation to the respective factor as module, and c) calculating the modular inverse of the value in relation to the module at least using the auxiliary values calculated in step b).

Further according to the invention, the above objects are completely or partially achieved by a computer program product which has program commands to cause a processor to calculate the modular inverse of a value in relation to a module, comprising:

a) determining a breakdown of the module into at least two factors, b) calculating a respective auxiliary value for each of the factors determined in item a), wherein each auxiliary value is the modular inverse of the value in relation to the respective factor as module, and c) calculating the modular inverse of the value in relation to the module at least using the auxiliary values calculated in item b).

Yet further according to the invention, the above objects are completely or partially achieved by a portable data carrier set up to calculate the modular inverse of a value in relation to a module, comprising:

a) determining a breakdown of the module into at least two factors, b) calculating a respective auxiliary value for each of the factors determined in item a), wherein each auxiliary value is the modular inverse of the value in relation to the respective factor as module, and c) calculating the modular inverse of the value in relation to the module at least using the auxiliary values calculated in item b).

The dependent claims define preferred configurations of the invention.

The invention starts from the basic consideration that the outlay for calculating the modular inverse is heavily dependent on the length of the module. The invention therefore proposes splitting the total calculation into several partial calculations, each of which is based on a shorter module. More precisely, the module is broken down according to the invention into at least two factors. Each of these factors is then used for the calculation of an auxiliary value, which is the modular inverse of the original value in relation to the factor as module. The total result is then determined from the calculated auxiliary values and further data, if applicable.

The basic idea according to the invention is surprising, because in general the factorizing of a value—here the module—is associated with prohibitive expense. However, the inventor has recognized that in many practically relevant situations at least a partial factorization of the module is already known or the factors can easily be calculated from other information. This is the case, for example, in the initially described key pair calculation for the RSA method, in which the factors P−1 and Q−1 of the module M are available without any effort.

The invention offers an appreciable increase in efficiency, which turns out greater, the stronger the computing outlay depends on the length of the module in the ultimately used inversion method. The invention is therefore particularly suitable for execution by relatively low-power processors. Security of the calculation against spying attacks is not impaired by employing the invention—compared with normal inversion methods. However, if there are particularly high security requirements, combining the invention with suitable measures for protection against spying presents no problems.

The order of listing of the method steps in the claims should not be understood as a limitation of the scope of the invention. Rather, configurations of the invention are provided, in which these method steps are executed in a different order and/or completely or partially parallel and/or completely or partially interleaved. The invention is, moreover, not limited to the processing of whole numbers. The method according to the invention can in fact use as values polynomials, for example, or in general the elements of a commutative ring with a unit element.

It is provided according to the invention to determine a breakdown of the module into factors. Here, the term "determine" is intended also to include cases in which only given, already known factors are accessed. If only two factors are known, in this context there is not even a selection of any kind. If more factors are known, the required number of factors is preferably selected. The factors can in this case be sorted or suitably combined according to their length or size. The term "length" is here to be understood in particular as the number of places of the factor in a denominational number system such as, e.g. the binary or decimal system.

The factors do not need to be prime. The terms "factorizing" or "breakdown" are therefore not necessarily to be understood as a prime factor breakdown. In preferred configurations of the invention it is rather provided also to process combined factors without further splitting, if, e.g. a splitting of this kind is not known or would lead to factors of greatly differing lengths. For reasons of efficiency it is desirable that the lengths of the factors which are ultimately used as modules for determining the inverse according to a known method differ from one another as little as possible (e.g. by less than 20% or by less than 50% of the greatest length).

As factorizing a value is in general extremely expensive in terms of computing, the method is preferably employed only if at least two factors of the module are known or can be determined with minimal outlay. Minimal outlay in this sense is assumed in particular if the breakdown of factors does not require any more computing operations than the determination of the inverse of the value in relation to the longest of the determined factors as module.

The method can already be meaningfully employed in a single splitting of the module into two or three or more factors. If more factors are known or easily determinable, the method can be repeatedly executed, recursive or iterative programming being possible. The module M preferably has different prime factors or is broken down in at least one calculation step into at least two different factors.

The computer program product according to the invention has program commands to implement the method according to the invention. A computer program product of this kind can be, for example, a semiconductor memory or a diskette or a CD-ROM on which a calculation program according to the invention is stored. A computer program product of this kind can be provided in particular for use in the production of smart cards.

In preferred configurations the computer program product and/or the portable data carrier are further developed with features corresponding to the above-described features and/or those mentioned in the dependent method claims.

BRIEF DESCRIPTION OF THE DRAWINGS

Further features, advantages and objects of the invention emerge from the following precise description of several embodiment examples and embodiment alternatives. Reference is made to the schematic drawings, in which.

DETAILED DESCRIPTION OF EXEMPLARY EMBODIMENTS

Figure 1:
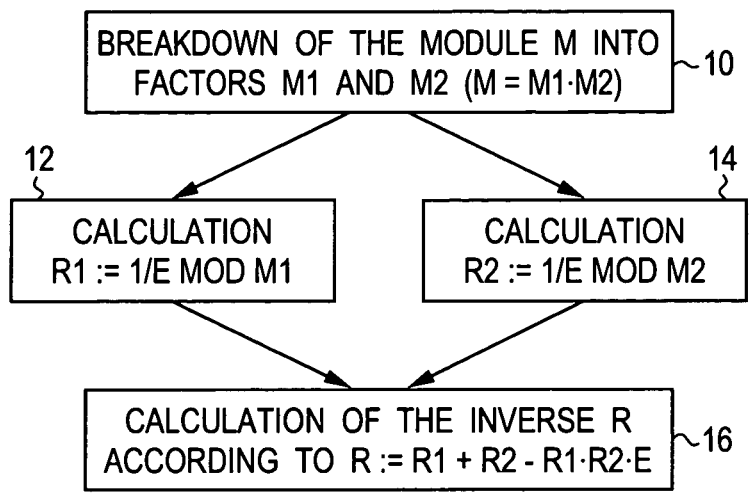
FIG. 1 shows a view of the calculation steps executed in an embodiment example of the invention.

The method schematically illustrated in FIG. 1 is provided to be executed by a processor of a portable data carrier, in particular a smart card or a chip module. The method is for this purpose implemented in the form of program commands for this processor, which are stored in a ROM or EEPROM of the data carrier.

In the present embodiment example the method is used for calculating the private key R for an RSA encoding method or an RSA signature method. For a given value E and given prime numbers P and Q the private key R is the modular inverse of the value E in relation to the module M with $M=(P-1)\cdot(Q-1)$. Factors $P-1$ and $Q-1$ of the module M are therefore already known. The fact that these factors are not themselves prime does not impair the sequence of the method. In embodiment alternatives the method is provided for other purposes of use, in particular for those in which a breakdown of factors of the module M is known or can be calculated with little effort.

In step 10 of the method a breakdown of the module M into two factors M1 and M2 is determined. These two factors M1 and M2 are in the present embodiment example simply the already present values $P-1$ and $Q-1$, so that neither a selection among several possibilities nor further calculation steps are required.

In steps 12 and 14 two calculations for determining the modular inverse of the value M in relation to the modules M1 and M2, respectively, are then performed, in order to obtain the auxiliary values R1 and R2. Any known method can be used for these calculations, such as, e.g. the initially mentioned extended Euclidian algorithm with or without use of the Chinese remainder theorem. It is also possible in steps 12 and 14 to call the method according to the invention recursively. This will be dealt with in greater detail later.

If the two auxiliary values R1 and R2 are present, in step 16 the calculation of the result R is made by evaluating the following relationship:

$$R=R1+R2-R1\cdot R2\cdot E \bmod M \qquad (*)$$

From mathematical considerations it follows that the thus calculated value R is indeed the modular inverse of E in relation to the module M, in other words, $R=1/E \bmod M$ applies.

If the factors M1 and M2 are of approximately the same size, in other words, e.g. have approximately the same length in their binary representation, the computing outlay for each of the two steps 12 and 14 in normal inversion methods comes to only approximately a quarter of the computing outlay for the inversion of E in relation to the module M. Step 10 does not require any computing operations. The outlay for step 16 is substantially determined by the two modular multiplications which run considerably faster—faster by a factor of 8, for example—than a modular inversion. The method therefore requires for steps 12, 14 and 16 only approximately $¼+¼+⅛=⅝$ of the outlay of an inversion of E in relation to the module M. Even in the simplest configuration of the method described here, in which only a single splitting of the module M into two factors M1, M2 takes place, a saving of approximately 25% results.

In a modification of the method of FIG. 1, in step 10 a splitting into three or more factors M1, M2, ..., rather than into two, is provided. In the calculation in step 16, an extended formulation of the relationship (*) for calculating R from the corresponding number of auxiliary values R1, R2, ... is then used.

As already mentioned, the method in steps 12 and/or 14 can be called recursively. This is, of course, meaningful at most if a further breakdown of factors of the values M1 and/or M2 is known or easily calculable. If this is not the case, recursion is terminated for the corresponding calculation branch and recourse taken to another algorithm known per se for inverse calculation.

Further termination conditions for recursion can be that only factors of considerably different length are present for the value to be broken down or a preset minimum size of the value to be broken down or its factors is dropped below. If, for example, in calculating the private key R in step 12 the modular inverse in relation to the module M, M1=P−1 is to be calculated for the (uneven) prime number P, then there is obviously a whole-number factorization P−1=2·((P−1)/2). If no further factors for (P−1)/2 are known, a recursive call with the factors 2 and (P−1)/2 is generally not advisable.

Figure 2:
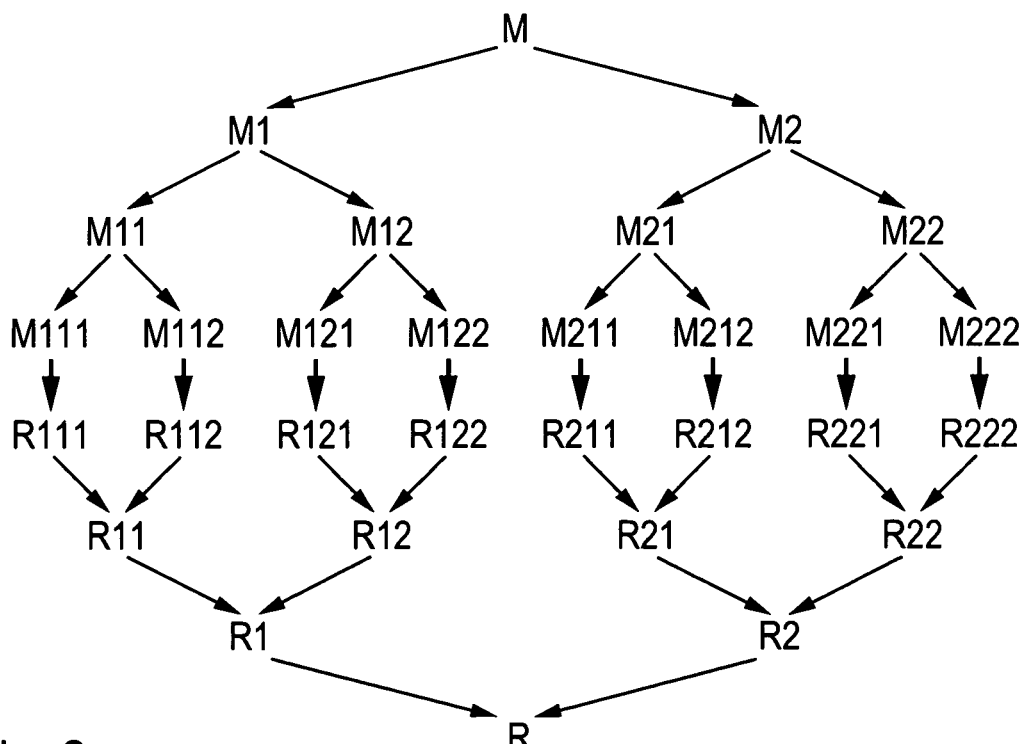
FIG. 2 shows a schematic illustration of a calculation sequence with a recursive call structure.

The call structure of a recursive calculation shown in FIG. 2 by way of example is fully balanced. The original module M has been split in the first step 10 into two factors M1 and M2, each of these factors Mx in a first recursion stage into the factors Mx1 and Mx2 and each of these factors Mxy in a second recursion stage into the factors Mxy1 and Mxy2. For the eight thus obtained factors Mxyz the corresponding modular inverse Rxyz of the value E in relation to the factor Mxyz has been calculated as auxiliary value. In the returns from the recursive calls firstly the auxiliary values Rxy are calculated according to step 16 from the auxiliary values Rxyz, then the auxiliary values Rx and finally the result R are calculated.

For a balanced calculation like that shown in FIG. 2, in which the recursion is performed with a uniform recursion depth n until $k=2^n$ factors are present, the outlay is only $O(m(k))$ basic operations, wherein $m(k)$ indicates the outlay for modular multiplication of two numbers of length k. This estimate assumes that all the finally present $2^n$ factors have approximately the same length. This is a considerable improvement compared with normal methods which require an outlay in the order of $O(m(k)\cdot \log(m(k)))$ basic operations (see e.g. corollary 11.10, page 305 of the already cited book by Gathen and Gerhard).

Figure 3:
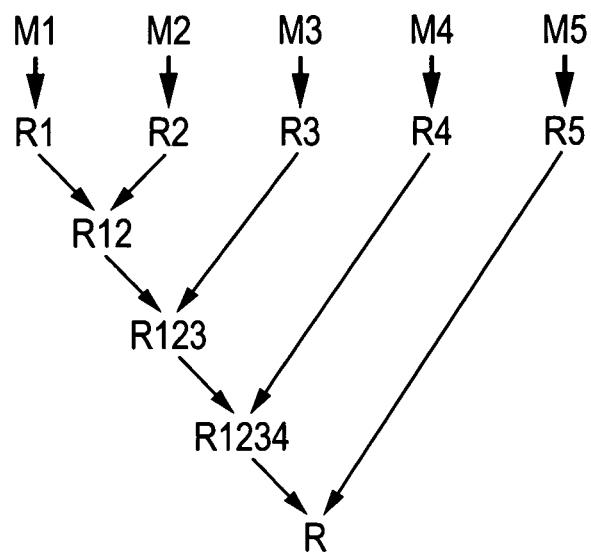
FIG. 3 shows a schematic illustration of an iterative calculation sequence.

In many practical applications a fully balanced sequence as in FIG. 2 cannot be achieved. FIG. 3 shows the extreme case of a completely unbalanced calculation sequence, starting from the module M=M1·M2·M3·M4·M5. A calculation of this kind corresponds to an iterative implementation of the method, e.g. by means of a program loop. The loop starts from a pair of auxiliary values R1, R2 and applies to this the relationship (*). In each loop cycle one further auxiliary value R3, R4, ... is added by one further application of the relationship (*), until finally the inverse R has been calculated. The newly required auxiliary value R1, R2, ... in each case can further be calculated in each loop cycle from the corresponding factor M1, M2 .... Alternatively it is possible to determine all the auxiliary values R1, R2, ... in advance in a separate loop from the factors M1, M2, ....

In general the method according to the invention—whether in recursive or iterative implementation—can serve for determining the inverse of a value E in relation to a module M, which is present in a not necessarily full factorization with any number of factors M1, M2, .... For this purpose, the relationship (*) is applied in each case to one pair of auxiliary values R1, R2, ..., which have been determined from the factors M1, M2, .... The computing outlay required is particularly low if the factors M1, M2, ... are of approximately uniform lengths. In order to guarantee this, in a preparatory step or during the calculation in each case two or more factors Mx, My, ... can be combined. They then become part of the calculation as the value Mx·My, which is not further broken down, even though its factorization would be known.

The particulars contained in the above description of sample embodiments should not be construed as limitations of the scope of the invention, but rather as exemplifications of preferred embodiments thereof. Accordingly, the scope of the invention should be determined not by the embodiments illustrated, but by the appended claims and their legal equivalents.

What is claimed is:

1. A method for calculating the modular inverse of a value E in relation to a module M, comprising the steps of:
    a) determining a breakdown of the module M into at least two factors M1, M2,
    b) calculating a respective auxiliary value R1, R2 for each of the factors M1, M2 determined in step a), wherein each auxiliary value R1, R2 is the modular inverse of the value E in relation to the respective factor M1, M2 as module, such that R1=1/E mod M1 and R2=1/E mod M2 hold, and
    c) calculating the modular inverse of the value E in relation to the module M at least using the auxiliary values R1, R2 calculated in step b),
    wherein the method is used for the cryptographic application of determining a private key for use in an RSA encoding method or an RSA signature method, the private key being the modular inverse of the value E in relation to the module M.

2. The method according to claim 1, wherein the module M fulfills the equation M=(P−1)*(Q−1) for two given prime numbers P and Q, and wherein the factors M1, M2 are determined from the two given prime numbers P and Q according to the equations M1=P−1 and M2=Q−1.

3. The method according to claim 1, wherein the at least two factors M1, M2 are determined in such a way that their respective lengths differ from one another by less than 50% of a greatest length.

4. The method according to claim 1, wherein in step c) the modular inverse of the value E in relation to the module M is calculated according to the relationship $$R=R1+R2-R1\cdot R2\cdot E \bmod M \qquad (*)$$

wherein R is the modular inverse of the value E in relation to the module M.

5. The method according to claim 4, wherein in at least one calculation the relationship (*) is repeatedly evaluated in an iterative method.

6. The method according to claim 5, wherein the relationship (*) is evaluated in connection with the calculation of the auxiliary values R1, R2.

7. The method according to claim 1, wherein in at least one calculation in step b) a recursive call of the method takes place.

8. The method according to claim 1, wherein in at least one calculation in step a) the module M is broken down into at least two different factors Ml, M2.

9. The method according to claim 4, wherein in at least one calculation in step a) the module M is broken down into at least two different factors M1, M2.

10. The method according to claim 2, wherein in step c) the modular inverse of the value E in relation to the module M is calculated according to the relationship $$R = R1 + R2 - R1 \cdot R2 \cdot E \bmod M \quad (*)$$

wherein R is the modular inverse of the value E in relation to the module M.

11. The method according to claim 1, wherein the method is executed by a processor of a smart card or of a chip module.

12. A computer program product which includes a computer program stored on a non-transitory computer-readable storage medium, the computer program having program commands to cause a processor to calculate the modular inverse of a value E in relation to a module M, the program commands causing the processor to implement functions comprising:
   a) determining a breakdown of the module M into at least two factors M1, M2,
   b) calculating a respective auxiliary value R1, R2 for each of the factors M1, M2 determined in item a), wherein each auxiliary value R1, R2 is the modular inverse of the value E in relation to the respective factor M1, M2 as module, such that R1=1/E mod M1 and R2=1/E mod M2 hold, and
   c) calculating the modular inverse of the value E in relation to the module M at least using the auxiliary values R1, R2 calculated in item b),
   wherein the computer program is used for the cryptographic application of determining a private key for use in an RSA encoding method or an RSA signature method, the private key being the modular inverse of the value E in relation to the module M.

13. The computer program product according to claim 12, wherein the module M fulfills the equation M=(P−1)*(Q−1) for two given prime numbers P and Q, and wherein the factors M1, M2 are determined from the two given prime numbers P and Q according to the equations M1=P−1 and M2=Q−1.

14. The computer program product according to claim 12, wherein the modular inverse of the value E in relation to the module M is calculated according to the relationship $$R = R1 + R2 - R1 \cdot R2 \cdot E \bmod M \quad (*)$$

wherein R is the modular inverse of the value E in relation to the module M.

15. The computer program product according to claim 14, wherein in at least one calculation in item a) the module M is broken down into at least two different factors M1, M2.

16. The computer program product according to claim 13, wherein the modular inverse of the value E in relation to the module M is calculated according to the relationship $$R = R1 + R2 - R1 \cdot R2 \cdot E \bmod M \quad (*)$$

wherein R is the modular inverse of the value E in relation to the module M.

17. The computer program product according to claim 12, wherein the processor is a processor of a smart card or of a chip module.

18. A portable data carrier set up to calculate the modular inverse of a value in relation to a module, comprising:
   a) determining a breakdown of the module M into at least two factors M1, M2,
   b) calculating a respective auxiliary value R1, R2 for each of the factors M1, M2 determined in item a), wherein each auxiliary value R1, R2 is the modular inverse of the value E in relation to the respective factor M1, M2 as module, such that R1=1/E mod M1 and R2=1/E mod M2 hold, and
   c) calculating the modular inverse of the value E in relation to the module M at least using the auxiliary values R1, R2 calculated in item b),
   wherein the portable data carrier is a smart card or a chip module, and
   wherein the portable data carrier is used for the cryptographic application of determining a private key for use in an RSA encoding method or an RSA signature method, the private key being the modular inverse of the value E in relation to the module M.

19. The portable data carrier according to claim 18, wherein the module M fulfills the equation M=(P−1)*(Q−1) for two given prime numbers P and Q, and wherein the factors M1, M2 are determined from the two given prime numbers P and Q according to the equations M1=P−1 and M2=Q−1.

20. The portable data carrier according to claim 18, wherein the modular inverse of the value E in relation to the module M is calculated according to the relationship $$R = R1 + R2 - R1 \cdot R2 \cdot E \bmod M \quad (*)$$

wherein R is the modular inverse of the value E in relation to the module M.

21. The portable data carrier according to claim 20, wherein in at least one calculation in item a) the module M is broken down into at least two different factors M1, M2.

22. The portable data carrier according to claim 18, wherein the modular inverse of the value E in relation to the module M is calculated according to the relationship $$R = R1 + R2 - R1 \cdot R2 \cdot E \bmod M \quad (*)$$

wherein R is the modular inverse of the value E in relation to the module M.

* * * * *